United States Patent
Tatehata et al.

(10) Patent No.: US 8,124,903 B2
(45) Date of Patent: Feb. 28, 2012

(54) INPUT DEVICE AND MANUFACTURING METHOD THEREOF

(75) Inventors: Naoki Tatehata, Kyoto (JP); Hiroshi Nakayama, Nara (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 12/042,420

(22) Filed: Mar. 5, 2008

(65) Prior Publication Data

US 2008/0237018 A1    Oct. 2, 2008

(30) Foreign Application Priority Data

Mar. 26, 2007   (JP) ................................. 2007-078502

(51) Int. Cl.
*H03K 17/795*   (2006.01)
(52) U.S. Cl. .................... 200/600; 345/168; 200/512
(58) Field of Classification Search .................. 200/600, 200/513, 517, 310, 314, 5 A; 345/168; 341/33, 341/34
See application file for complete search history.

(56) References Cited

U.S. PATENT DOCUMENTS

| | | | |
|---|---|---|---|
| 5,924,555 A | | 7/1999 | Sadamori et al. |
| 5,950,808 A * | | 9/1999 | Tanabe et al. ................. 200/314 |
| 6,373,008 B1 | | 4/2002 | Saito et al. |
| 6,924,448 B2 * | | 8/2005 | Sera et al. ..................... 200/516 |
| 6,924,789 B2 * | | 8/2005 | Bick .............................. 345/168 |
| 7,070,349 B2 * | | 7/2006 | Dombrowski et al. ....... 200/5 A |
| 2002/0049070 A1 | | 4/2002 | Bick |
| 2003/0042121 A1 | | 3/2003 | Hirahata et al. |
| 2004/0129548 A1 * | | 7/2004 | Ito et al. ........................ 200/513 |
| 2005/0275627 A1 | | 12/2005 | Soma |
| 2006/0077181 A1 | | 4/2006 | Sato |
| 2006/0232559 A1 | | 10/2006 | Chien et al. |
| 2008/0179173 A1 * | | 7/2008 | Jung et al. ..................... 200/314 |

FOREIGN PATENT DOCUMENTS

| | | |
|---|---|---|
| CN | 1407572 A | 4/2003 |
| JP | 2001-273831 A | 10/2001 |
| JP | 2002-196856 A | 7/2002 |
| JP | 2002-216582 A | 8/2002 |
| JP | 2004-535712 A | 11/2004 |
| JP | 2005-352896 A | 12/2005 |
| JP | 2006-012110 A | 1/2006 |
| KR | 1998-033035 | 7/1998 |
| KR | 10-2006-0082216 | 7/2006 |
| KR | 10-2006-0082216 A | 7/2006 |
| TW | 200638248 A | 1/2006 |
| WO | WO 02/100074 A3 | 12/2002 |

OTHER PUBLICATIONS

Japanese Office Action for Application No. 2007-078502, Mar. 1, 2011, Panasonic Corporation. Chinese Office Action for 200710193316.7, May 25, 2011, Panasonic Corporation.
Tiawanese Office Action for Application No. 096143006, Apr. 20, 2011, Panasonic Corporation.
Chinese Office Action for 200710193316.7, Mar. 11, 2010.

* cited by examiner

*Primary Examiner* — Felix O Figueroa
(74) *Attorney, Agent, or Firm* — RatnerPrestia

(57) ABSTRACT

An input device for constructing an inputting operation unit for various electronic apparatus and a method of manufacturing the input device are provided. The input device allows push-down inputting operation and position inputting operation using the same operating unit. The input device has a position input sensor provided under a key, and a base sheet having a movable contact joined to its bottom face depending on the location where the key is disposed, and a columnar section is disposed in a manner sandwiched between the position input sensor and the base sheet at the center of the movable contact.

4 Claims, 5 Drawing Sheets

INPUT DEVICE AND MANUFACTURING METHOD THEREOF

FIELD OF THE INVENTION

The present invention relates to input devices that constitute an inputting operation unit for various electronic apparatus and method of manufacturing the input devices.

BACKGROUND OF THE INVENTION

As an inputting operation unit for various electronic apparatus, input devices provided with push-button type input means are in wide use such as in portable telephones. By manipulating such an input device, telephone numbers can be inputted into a portable telephone.

Also, as Internet connectivity environment is put in place in recent years, frequent Internet access is practiced giving rise to need to freely move a cursor on a display.

In order to make such an operation, input devices that combine a position input device for moving a cursor on a display and a push-down device for inputting telephone numbers and the like have been contrived.

A description of such a conventional input device will be given below with reference to FIG. 9.

FIG. 9 is a sectional view of a conventional input device.

The position inputting operation using this conventional input device is an action of tracing the top of key 101 or the surface of keymat 102 with a finger. Touch pad 104 is disposed under keymat 102. As a finger has electrical conductivity, the electrostatic capacitance of an electrode (not shown) inside touch pad 104 changes by a tracing action. Position coordinate is detected by inputting the information on the electrostatic capacitance change into a controller (not shown) for processing in a predetermined way by the controller.

Also, for push-down inputting operation, a push-down switch, for example, is used. An indication marking (not shown) is provided on the primary surface on the top face of key 101. Dome-shaped element 107 made of an elastic thin metal sheet having a circular or elliptical contour and a convex top portion is disposed on substrate 106 at a location corresponding to the position of the indication marking. A push-down type switch is thus constructed in which dome-shaped element 107 functions as a movable contact. Downwardly protruding columnar section 103 integrally formed with key 101 passes through opening 105 provided on touch pad 104 in order that the center of dome-shaped element 107 can be pushed by the bottom edge of columnar section 103. When key 101 is pushed down, dome-shaped element 107 is deformed by being pushed by columnar section 103, and its bottom face makes at least two conductive elements 108 that are correspondingly disposed on substrate 106 conducting with each other thus detecting an input.

As a conventional art literature relating to the present invention, Japanese Translation of PCT Publication 2004-535712, for example, is known.

In such a conventional input device like this, it is easy to configure a device by combining keymat 102 and touch pad 104. However, in the step of combining each key 101 of keymat 102 attached with touch pad 104 and each dome-shaped element 107, if there is a clearance between columnar section 103 and dome-shaped element 107, when depressing key 101 a difference is caused between the stroke of columnar section 103 coming into contact with dome-shaped element 107 and the stroke of columnar section 103 depressing and deforming dome-shaped element 107 while, at the same time, producing a reaction force from dome-shaped element 107. The difference in the strokes is felt by the finger making the touch uncomfortable feeling. For this reason, it is necessary to adjust the height so that the tip of columnar section 103 precisely comes in contact with dome-shaped element 107. This causes an increase in the manufacturing cost as the workability of adjustment in the manufacturing process is poor.

On the other hand, by directly or indirectly joining each of columnar section 103 of keymat 102 which is attached to touch pad 104 to corresponding dome-shaped element 107, the clearance between columnar section 103 and dome-shaped element 107 can be eliminated and worsening of touch of push-down operation can be suppressed. However, when columnar section 103 is joined at a position displaced from the center of dome-shaped element 107, the state of inversion of dome-shaped element 107 during push-down operation becomes asymmetrical and original reaction force and stroke cannot be obtained thus worsening the touch feeling. For this reason, it is necessary to join them while strictly controlling the dimension of keymat 102 which is normally formed into a shape having a plurality of columnar sections 103 made of an elastic material such as silicone rubber, and positioning each columnar section 103 to the center of respective dome-shaped elements 107. Accordingly, even when adopting this configuration, workability further worsens thus suffering an increase in the cost.

SUMMARY OF THE INVENTION

An exemplary embodiment of the present invention addresses the conventional problems as described above and provides an input device inexpensive in structure yet allowing push-down inputting operation and position inputting operation using the same operating unit in a comfortable way. The exemplary embodiment of the present invention has the following structure to attain this purpose.

The exemplary embodiment of the present invention relates to an input device that comprises a plurality of keys, a position input sensor that is disposed under the keys and that allows detection of input status based on a change of electrostatic capacitance due to displacement of a finger or a conductor on the keys, a base sheet disposed underneath the position input sensor, push-down-input type movable contacts made of a thin metal sheet disposed below the base sheet formed in the shape of an upwardly protruding dome having a circular or elliptical contour and located corresponding to positions of the keys, and a columnar section provided in a manner sandwiched between the position input sensor and the base sheet. As the columnar section is provided in contact with the position input sensor and the base sheet at a position corresponding to the center of the movable contacts, the need for positioning to prevent worsening of touch is eliminated and an inexpensive input device is provided that allows comfortable push-down inputting operation and position inputting operation.

Also, as the columnar section is joined to the rear face of the position sensor and the top face of the base sheet, the present invention can provide an input device in a modular form in which the position input sensor and the base sheet are combined into an integral unit.

Also, the position input sensor of the present invention comprises a sensor sheet made by forming a conductive material such as silver and copper into a predetermined electrode pattern, where the electrode pattern is formed in a manner avoiding the portion where the columnar section and the position input sensor are in contact. With this, the electrode pattern can be isolated from the stress due to push-down operation. At the same time, when joining the columnar section to the position input sensor or the base sheet, ultraviolet light can be fully transmitted to stabilize adhesion at the location.

Also, as an exemplary embodiment of the present invention uses an electroluminescent sheet as the base sheet, primary surfaces of keys can be illuminated by its electroluminescent light.

An exemplary embodiment of the present invention includes a method for manufacturing the input device in which the adhesive layer is pattern-printed on the rear face of the base sheet, followed by forming the contour and holes, attaching movable contacts via the adhesive layer, securing the columnar section on the top face of the base sheet by means of a UV-curable adhesive after positioning it in the center of the movable contact with reference to the contour or hole of the base sheet, and securing the position sensor on the top face of the columnar section by means of a UV-curable adhesive. Thus, an input device that enables push-down inputting operation and position inputting operation using the same operating unit can be manufactured at a low cost.

DETAILED DESCRIPTION OF THE EXEMPLARY EMBODIMENTS

Referring to FIG. 1 to FIG. 8, a description of an exemplary embodiment of the present invention will be given in the following.

Exemplary Embodiment

Figure 1:
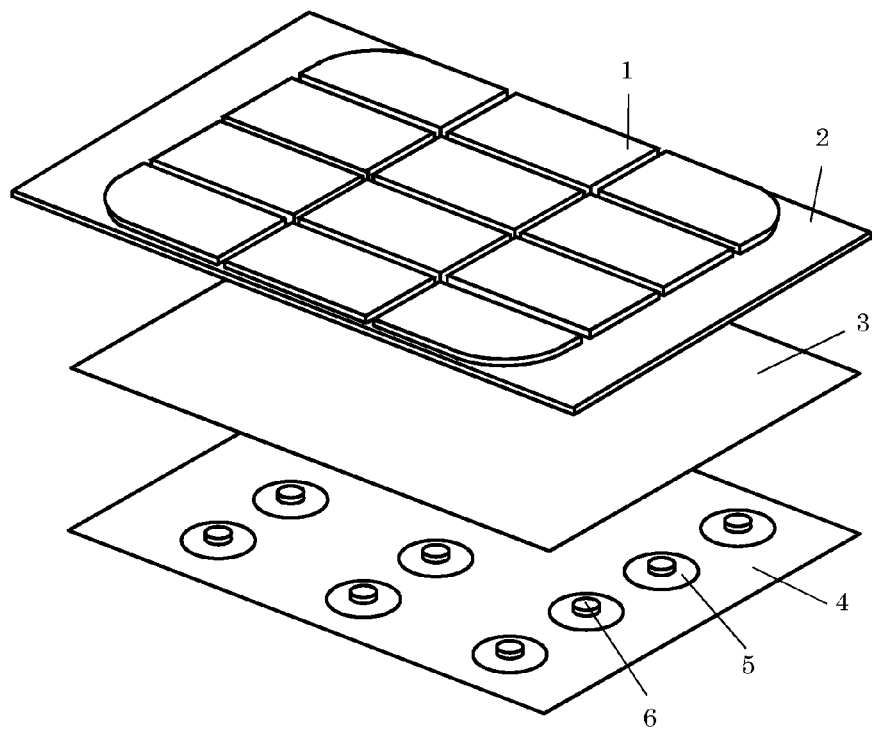
FIG. 1 is an exploded perspective view of an input device in a preferred embodiment of the present invention.
Figure 2:
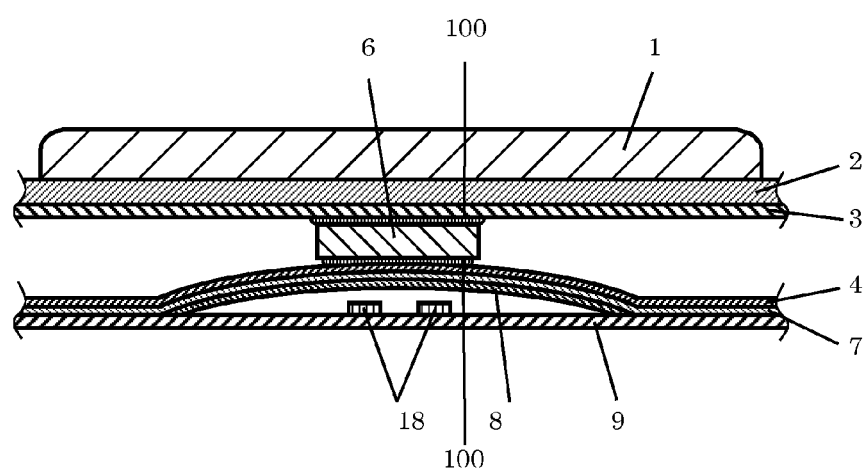
FIG. 2 is a sectional view of the input device.

FIG. 1 is an exploded perspective view of in input device in an exemplary embodiment of the present invention. FIG. 2 is a sectional view of the input device.

As illustrated in the diagram, plural keys 1 made of a plastic material such as polycarbonate are arranged on the primary surface of the input device. Keymat 2 made of an elastic material such as silicone rubber is disposed under key 1. Key 1 and keymat 2 may be made of the same material or may be formed as an integral unit.

The bottom face of keymat 2 is formed flat and position input sensor 3 is joined to the bottom face of keymat 2 through an adhesive layer (not shown). Position input sensor 3 is configured by patterning an electrode (not shown) made of silver, for example, on a transparent PET film and the like and is connected to a control unit (not shown) consisting of a controller IC and the like. When a finger or a conductor comes close to or moves over the upper side of key 1, electrostatic capacitance of the electrode of position input sensor 3 changes and the change is detected by the control unit to determine the operating condition.

Base sheet 4 is disposed under position input sensor 3. As shown in FIG. 2, base sheet 4 is joined to substrate 9 through adhesive layer 7 formed on the under surface.

Depending on the location of key 1 disposed on the top face, substrate 9 has an electrically conductive part such as a wiring pattern that functions as fixed contact 18 for movable contact 8. In correspondence to the location of fixed contact 18, movable contact 8 (not shown in FIG. 1) made of a thin metal sheet and formed in the shape of an upwardly protruding dome having a circular or elliptical contour is disposed at respective location of substrate 9. Top face of each movable contact 8 is joined to adhesive layer 7 formed on the rear face of base sheet 4. Each of movable contact 8 is disposed between dome-shaped section 5 of base sheet 4 and substrate 9.

Furthermore, columnar section 6 formed in a virtually cylindrical shape is provided at a position corresponding to the center of each movable contact 8. Columnar section 6 is disposed in a manner sandwiched between the top face of dome-shaped section 5 of base sheet 4 and the bottom face of position input sensor 3 with its top and bottom faces joined to the bottom face of position input sensor 3 and the top face of dome-shaped section 5, respectively. Columnar section 6 is adhered to the bottom face of position input sensor 3 and the top face of dome-shaped section 5 of base sheet 4 with adhesive 100.

The input device in accordance with the present invention is configured as described above. Its operation will now be described.

To begin with, on depressing push-down key 1, keymat 2 that has resilience is bent causing position input sensor 3 to bend while transmitting the depressing force through columnar section 6 to the center of dome-shaped movable contact 8. When the force exceeds a predetermined magnitude, the center of movable contact 8 elastically flips causing the bottom face to come in contact with fixed contact 18 on substrate 9 thus resulting in a switched-on state.

In this preferred embodiment, it is not necessary to provide an opening in position input sensor 3 and a plunger, such as a columnar section, in the bottom of keymat 2 and pass the plunger through the opening as in a conventional input device, and the cost of providing the opening can be cut. Also, use of a complicated die to provide the opening is not required. As a flat sheet-like material can be used for keymat 2, it can be realized at a low cost.

Also, in this preferred embodiment, as columnar section 6 is in contact with position input sensor 3 and base sheet 4 in advance, a finger can feel a reaction force from movable contact 8 upon start of push-down operation of key 1, and an input device with a good touch can realized. Also, differently from conventional input devices, it is not necessary to make heightwise positioning and a low cost input device can be provided.

Furthermore, as columnar section 6 is disposed in the center of movable contact 8, even in the event the center of key 1 and the center of movable contact 8 are slightly displaced, the touch will not worsen as the position at which movable contact 8 is depressed always stays at the center.

By adopting the configuration in which columnar section 6 is joined to the rear face of position input sensor 3 and the top face of base sheet 4, it is easy to provide an input device of a modular design with which position input sensor 3 and base sheet 4 are integrated. In this case, as each of the elements is securely joined, an input device with a more stable structure can be realized. While columnar section 6 need not necessarily be securely joined to position input sensor 3 and base sheet 4, columnar section 6 may be joined to base sheet 4 and position input sensor 3 may be coupled to it.

By the way, an electroluminescent sheet may be used in stead of base sheet 4. With such configuration, primary surface of the keys can be illuminated by electroluminescence.

A description of position inputting operation by tracing key 1 with a finger will now be given. As fingers are electrically conductive, the electrostatic capacitance of each of the electrodes of position input sensor 3 changes depending on the position of the finger. Position is determined by inputting the electrostatic capacitance change into a control unit (not shown) for performing arithmetical operation based on a signal obtained by position input sensor 3 and making a predetermined processing.

The means for position inputting need not necessarily be a capacitive sensor. By employing a configuration with which position inputting operation does not require direct touch on position input sensor 3 as in the preferred embodiment, deterioration and pollution of position input sensor 3 can be prevented thus assuring longer life and reliability with ease.

Position input sensor 3 may be made of a sensor sheet on which a predetermined electrode pattern is formed using an electroconductive material such as silver and copper. Further description of the sensor sheet will be given with reference to FIG. 3.

Figure 3:
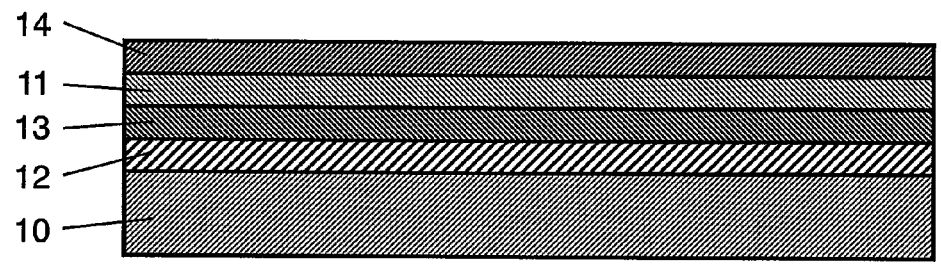
FIG. 3 is a sectional view of a sensor sheet as a key part of the input device.

FIG. 3 is a sectional view of the sensor sheet. As shown in FIG. 3, the sensor sheet has a laminated structure prepared on base film 10, where insulation layer 13 is sandwiched between first electrode pattern 11 and second electrode pattern 12 to prevent them from coming into contact with each other, and insulation layer 14 is provided to cover the primary surface. Here, vertical positions of first electrode pattern 11 and second electrode pattern 12 later to be described in more detail may be counterchanged.

In the meantime, it is preferable to use an ultraviolet transmitting material for base film 10, insulation layer 13, and insulation layer 14. By employing such a material, it becomes possible to transmit ultraviolet light through the portion where first electrode pattern 11 and second electrode pattern 12 are not overlapping when joining columnar section 6 to position input sensor 3 or base sheet 4 using a UV-curable adhesive thus enabling easy joining with a UV-curable adhesive.

Here, a description will be given on an example of laying out electrode patterns of the sensor sheet with reference to the schematic electrode pattern of FIG. 4.

Figure 4:
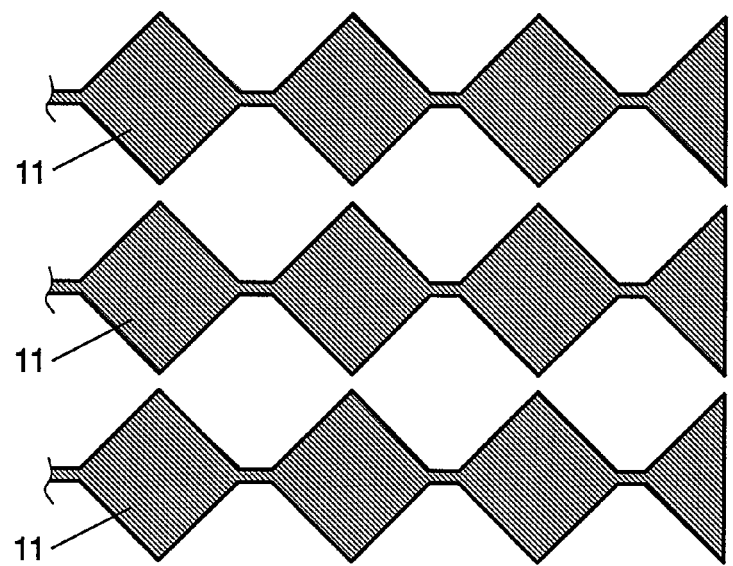
FIG. 4 is a schematic diagram of an electrode pattern as a key part of the sensor sheet.
Figure 5:
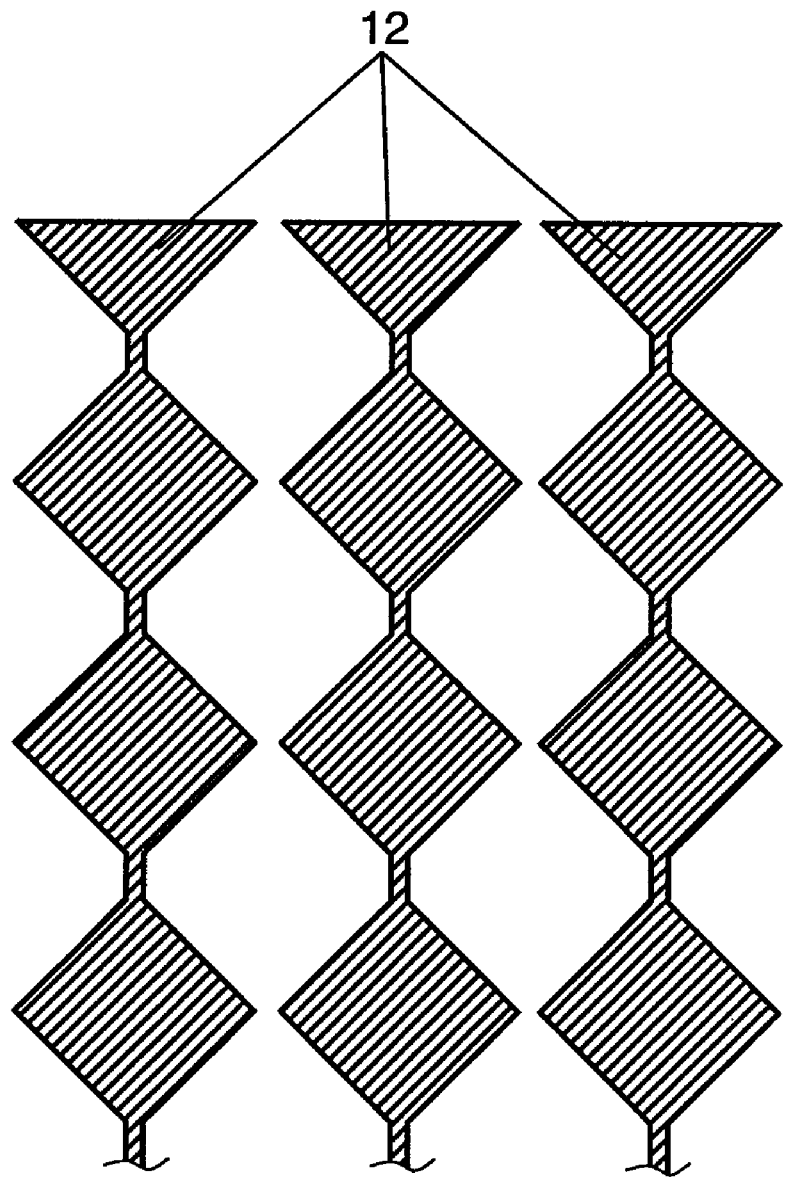
FIG. 5 is another schematic diagram of the electrode pattern as a key part of the sensor sheet.

FIG. 4 illustrates the state of formation of first electrode pattern 11 and FIG. 5 illustrates the state of formation of second electrode pattern 12. FIG. 4 and FIG. 5 do not show wiring electrodes.

More than one first electrode pattern 11 extending in a horizontal direction (direction of X-axis) is arranged in a vertical direction (direction of Y-axis) as shown in FIG. 4. With this layout, it is possible to detect where in the vertical direction (direction of Y-axis) a finger is touching. More than one second electrode pattern 12 extending in a vertical direction (direction of Y-axis) is arranged in a horizontal direction (direction of X-axis) as shown in FIG. 5. With this layout, it is possible to detect where in the horizontal direction (direction of X-axis) a finger is touching. As can be seen in the diagrams, each of the electrodes is formed in a rectangular shape and an electrode structure is configured by connecting the electrodes in line.

Figure 6:
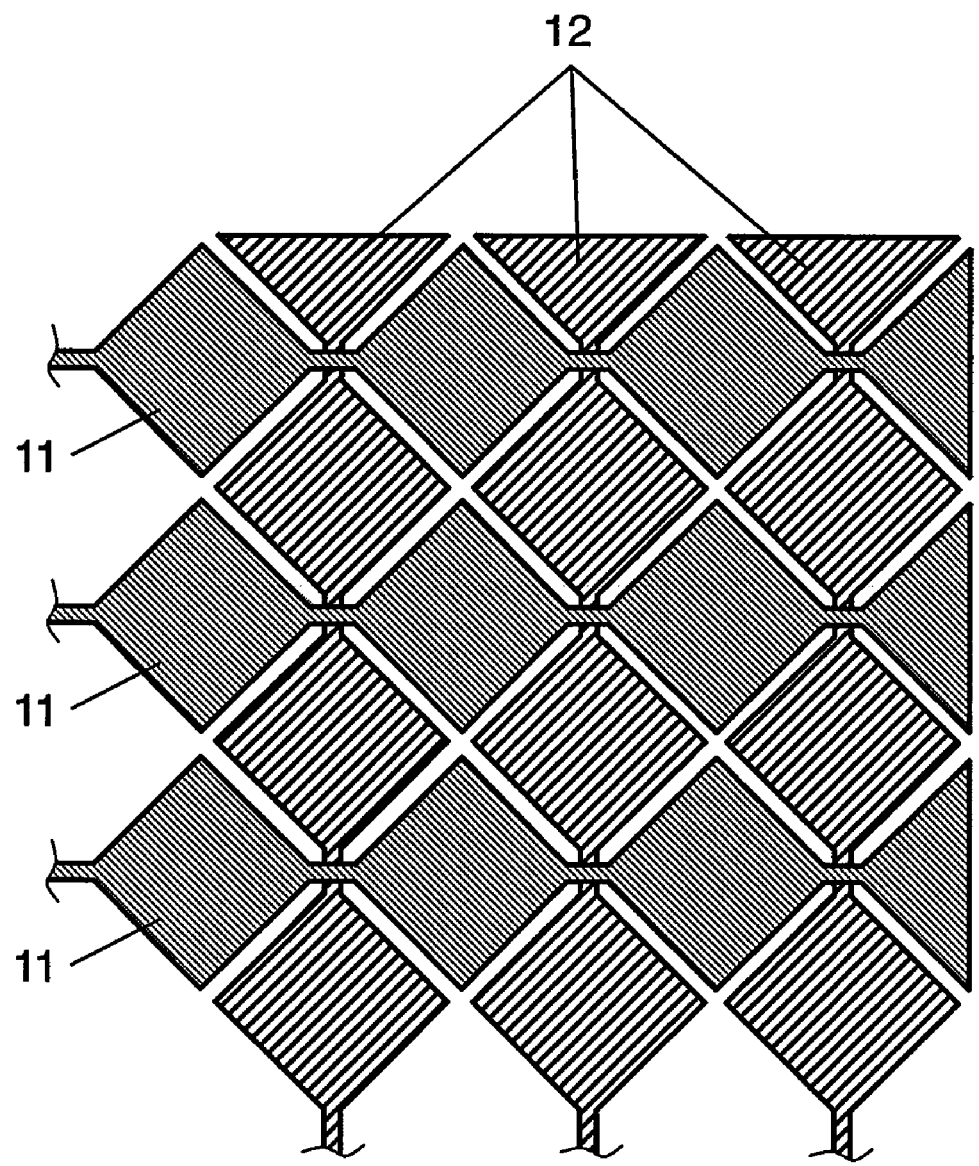
FIG. 6 is a schematic transparent view of interlaced arrangement of electrode patterns as key parts of the sensor sheet.

With the sensor sheet, electrodes are arrayed in a matrix as shown by the transparent view from above of FIG. 6 to allow detection of each of the X-Y coordinates. In order to make detection of electrostatic capacitance change easier, it is preferable to adopt a geometrical configuration so that the area of each electrode becomes as large as possible and symmetrical.

In this preferred embodiment, a configuration is employed in which columnar section 6 comes in contact with position input sensor 3 as shown in FIG. 2. A further description in detail of configuration examples of electrode patterns 11, 12 of the sensor sheet at the contacting point will be given below.

Figure 7:
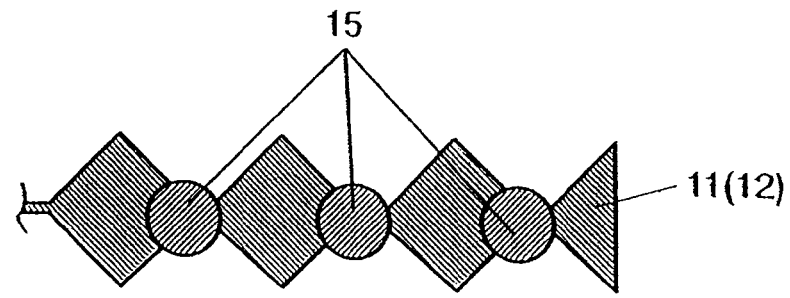
FIG. 7 is a schematic transparent top view of the contact portions of the electrode patterns of the sensor sheet and the columnar section.
Figure 8:
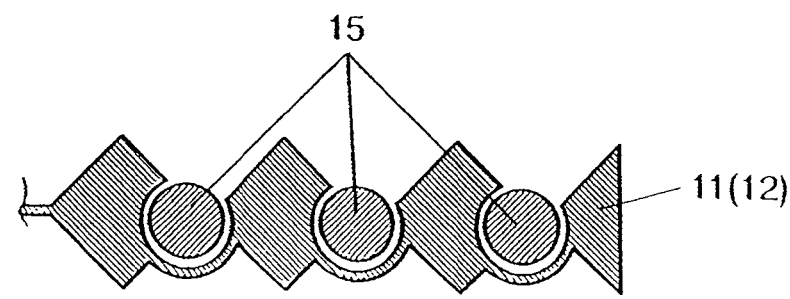
FIG. 8 is another schematic transparent top view of the contact portions of the electrode patterns of the sensor sheet and the columnar section.
Figure 9:
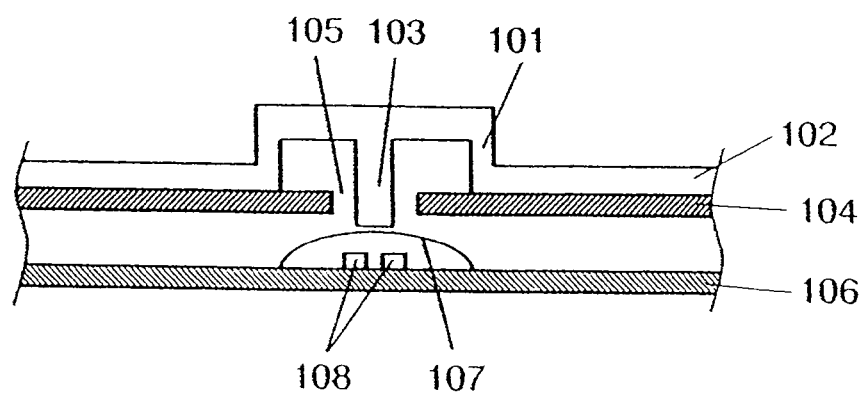
FIG. 9 is a sectional view of a conventional input device.

FIG. 7 shows a single electrode when electrode patterns 11, 12 are formed in a simple geometrical shape in which contact section 15 where columnar section 6 comes in contact with position input sensor 3 is overlapping with electrode patterns 11, 12. FIG. 8 shows a pattern formation in which electrode patterns 11, 12 are modified to avoid overlapping of contact section 15 and electrode patterns 11, 12.

With the configuration of electrode patterns 11, 12 shown in FIG. 8, it is possible to isolate the electrode patterns from a stress caused by push-down operation. Also, when joining columnar section 6 to position input sensor 3 or base sheet 4 with a UV-curable adhesive, ultraviolet light can be transmitted to the sensor sheet by employing an ultraviolet-permeable material as insulation layer 14 thereby to stabilize joining condition of the joined section.

When adopting the electrode pattern configuration of FIG. 8, symmetry is lost and the information on position detection may be slightly displaced from the original position of a finger. However, such displacement can be corrected by the control unit, for example. Needless to say, it is good to adopt the configuration of FIG. 7 which does not cause such displacement. In such a case, it is important to set the thickness of insulation layers 13, 14 in consideration of the thickness and other factors of insulation layers 13, 14 based on the conditions of use and other factors.

Next, a description of method of manufacturing the input device in accordance with the preferred embodiment of the present invention will be given.

To begin with, adhesive layer 7 is printed by screen printing on a sheet for making base sheet 4. Base sheet 4 is then formed by cutting along a contour followed by joining top face of movable contact 8 to adhesive layer 7 formed on the bottom face of base sheet 4. Columnar section 6 is placed on top of base sheet 4 after coating a UV-curable adhesive by means of a dispenser needle, for example, at the center of movable contact 8 and secure columnar section 6 by illuminating ultraviolet light. Subsequently, a UV-curable adhesive is placed on the top face of columnar section 6 using a needle such as a dispenser, followed by placing position input sensor 3 and securing by illuminating ultraviolet light. By the way, as UV-curable adhesives are normally more flexible than thermo-setting adhesives, an input device can be configured without affecting the touch of push-down operation by securing columnar section 6 using a UV-curable adhesive.

By the way, a hole may be formed when cutting base sheet 4 along the contour. By carrying out each step using the hole as the reference for positioning, the input device can be manufactured with good accuracy.

Also, the adhesive layer of base sheet 4 may be formed as a pattern to make movable contact easily movable. By so doing, the touch of push-down operation can be further improved.

The input device in accordance with the present invention provides a low-cost unit with which position inputting operation and push-down inputting operation can be comfortably performed using the same operating unit and is useful for configuring an inputting operation unit for various electronic apparatus.

What is claimed is:

1. An input device comprising:
    a plurality of keys;
    a position input sensor disposed under the plurality of keys and adapted to detect an input status based on a change of electrostatic capacitance due to transfer of a finger or a conductive material on a top side of the plurality of keys;
    a base sheet disposed under the position input sensor;
    a push-down-input type movable contact made of a thin metal sheet and formed in an upwardly protruding dome-shape having a circular or elliptical contour and disposed under the base sheet corresponding to the positions of the keys; and
    a substrate disposed under the movable contact and having a conductive region such as a wiring pattern corresponding to the movable contact, wherein
    a columnar section is further provided at a position corresponding to the center of the movable contact in a manner sandwiched between the position input sensor and the base sheet, and
    the position input sensor comprises a sensor sheet having a predetermined electrode pattern formed using a conductive material such as silver and copper, and the electrode pattern is formed in a manner avoiding the portion where the columnar section and the position input sensor come in contact with each other.

2. The input device of claim 1, wherein the columnar section is adhered to a bottom face of the position input sensor and a top face of the base sheet with an adhesive.

3. The input device of claim 1, wherein an electroluminescent sheet is employed as the base sheet.

4. The input device of claim 1, wherein the position input sensor and the columnar section are formed of an ultra violet transmitting material, and the columnar section is joined to the bottom face of the position input sensor and the top face of the base sheet with a UV curable adhesive.

* * * * *